United States Patent

Liberman et al.

[11] Patent Number: 5,857,352
[45] Date of Patent: Jan. 12, 1999

[54] RIBBON-FREEZING METHOD AND APPARATUS

[75] Inventors: Barnet L. Liberman, New York, N.Y.; Kevin C. Vandervoort, Enfield, Conn.; Peter H. Glidden; Robert J. Peacock, II, both of Lubec, Me.

[73] Assignee: Winterlab Limited, New York, N.Y.

[21] Appl. No.: 915,016

[22] Filed: Aug. 20, 1997

Related U.S. Application Data

[62] Division of Ser. No. 735,657, Oct. 24, 1996, Pat. No. 5,761,913.

[51] Int. Cl.$^6$ .................................................. A23G 9/00
[52] U.S. Cl. ........................................ 62/345; 62/374
[58] Field of Search ................... 62/64, 345, 373–376; 198/603

[56] References Cited

U.S. PATENT DOCUMENTS

| | | | |
|---|---|---|---|
| 3,689,958 | 9/1972 | Dillon | 62/64 |
| 3,695,895 | 10/1972 | Brown | 62/345 |
| 4,654,217 | 3/1987 | Nagoshi | 426/524 |
| 4,657,768 | 4/1987 | Nagoshi | 426/524 |
| 4,689,963 | 9/1987 | Sakai | 62/64 |
| 4,840,034 | 6/1989 | Liberman | 62/64 |
| 4,840,035 | 6/1989 | Liberman | 62/64 |
| 5,001,047 | 3/1991 | Liberman | 435/1 |

OTHER PUBLICATIONS

Copy of Patent Application Showa 63–262652 filed Oct. 17, 1988.

*Primary Examiner*—William E. Tapolcai
*Attorney, Agent, or Firm*—Cohen, Pontani, Lieberman & Pavane

[57] ABSTRACT

A method and apparatus for improved control of ice-crystal formation in solid and semi-solid organic materials during freezing in a bath containing a cruciferous-oil slush is disclosed. Ribbon racks are used both to separate the items being frozen from each other and to efficiently distribute the items across the bath. This separation and distribution of the items in a ribbon improves control of the rate of freezing by preventing brine shock when the items are immersed in the brine and preventing cumulative localized thermal exhaustion during the freezing process. The ribbon rack freezing apparatus is adjustable to accommodate the variations in dwell times and flow rates required by different materials.

14 Claims, 7 Drawing Sheets

RIBBON-FREEZING METHOD AND APPARATUS

This is a division of application Ser. No. 08/735,657, filed Oct. 24, 1996, now U.S. Pat. No. 5,761,913.

BACKGROUND OF THE INVENTION

1. Field of the Invention

The present invention is broadly directed to systems for the preservation of organic material by freezing. More particularly, the present invention pertains to systems using fluids for freezing organic materials that have solid or semi-solid components.

2. Discussion of Related Art

Fish and meat products are conventionally frozen by direct contact with chilled surfaces or immersion in brines containing calcium chloride and/or ethylene or propylene glycols, or immersion in the more expensive liquid nitrogen or liquid carbon dioxide. These processes result a in loss of taste and texture in these products, through improper ice crystal formation during freezing. This produces an undesirable concentration of salts in the flesh, as water crystallizes out of the flesh during freezing, and a subsequent loss of naturally-occurring flavored juices that have crystallized with the ice, upon thawing.

Portions of frozen foods that are shipped in heat-sealed plastic bags are well-known in the food industry. The portions in these bags may be scaled for commercial restaurant use as well as for use by individual families or family members. In many instances the food stuffs are vacuum-packed and ready to be heated in the bag, either in a microwave or in boiling water, and served immediately. They are very convenient because they are then ready-to-eat after heating without further preparation.

However, all conventional frozen foods are subject to some structural breakdown, breakdown caused by improper ice crystal formation in the original freezing or improper maintenance of its frozen condition while in storage. This structural breakdown is particularly objectionable in heat-sealed plastic bags containing pre-cooked, ready-to-eat foods. For example: a frozen casserole of cooked, tender stew meat and vegetables rapidly turns to mush, if improperly maintained in the frozen state. Furthermore the result of this is particularly objectionable when it occurs in individual ready-to eat portions. The ice crystals that break up the solid structure of meat and vegetables, when the item partially thaws and then is refrozen, may affect the food uniformly throughout the bag, damaging the entire portion because of the relatively small volume of each portion.

Ready-to-cook meat, vegetable and fish portions, whether raw or pre-treated by superficial searing, broiling or deep-frying are even more sensitive. They are subject to particularly serious quality degradation in the initial freezing process, as well as to the hazards of refreezing, because a greater firmness and definition of texture is expected from filets and steaks, than from pre-cooked, heat-and-eat frozen foods such as stews or sauces.

In the fisheries industry, it was discovered that the addition of cruciferous oils to conventional brines both increased the freezing rate and resulted in an increased thawing rate for fish frozen directly in brine, as discussed in U.S. Pat. Nos. 4,654,217; 4,657,768 and 4,840,035. A rapid freezing rate causes materials to freeze as a block, preventing the growth of a destructive multiplicity of ice crystals that macerates the texture of vegetable foodstuffs as well as flesh. The formation of multiple ice crystals extending radially from the center of a solid item is also believed by some to accelerate drip-related flavor losses during thawing. The rapid thawing rate exhibited by foods frozen in such brines may also prevent a subsequent damage by preventing the formation of new, potentially destructive ice-crystal structures during the intervening half-frozen/half-thawed state.

The operating range mentioned in disclosures of freezing methods using cruciferous-oil brines, $-22°$ and $-48°$ F. ($-30°$ and $-44.4°$ C.), represents the range within which various cruciferous-oil brine formulations can be maintained in the semi-liquid "slush" state. Above that range the brine lacks the necessary ice-crystal content and below that range the brines begin to become nearly solid, too stiff to transfer heat efficiently. However, we have observed that the taste as well as the texture of flesh and other organic tissues is best preserved when the brine cooling it is maintained within a rather narrow range, a range about $4°$ F. ($2.2°$ C.) wide, during the entire freezing process. The proper set point for this narrow operating range depends on the flow rate of the brine, the volume and cross-sectional dimensions of the item and the quantity of heat stored in each, among other things. A too-fast flow or a too-cold brine is wasteful.

Control of brine-flow dynamics, as well as control of brine cooling and the temperature variations within the bath 6 that are produced by the tendency to thermal layering in laminar brine flows are critically important to maintaining the brine at the surface of the food being frozen within this narrow range to assure that the desired type of ice-crystal formation takes place. For example, 1-inch (2.54-cm) thick salmon steaks should be frozen in a cruciferous-oil brine flowing at 3 feet/minute (0.91 meters) and maintained between $-37°$ and $-41°$ F. ($-38.33°$ and $-40.56°$ C.). In contrast, 2-inch (5.08-cm) thick tuna steaks are oilier as well as thicker, so that the brine needs to be a bit colder, between $-38°$ and $-42°$ F. ($-38.9°$ and $-41.1°$ C.), but need flow only about half as fast through the bath, 1.5 to 2 feet/minute (0.46 to 0.61 meters/minute)

Basically, the interior of each block of tissue must pass must very rapidly through the $-0.5°$ to $-5.0°$ C. range where the damaging ice crystals are most likely to form. The cruciferous oil brines are advantageous for this purpose because, between $-33°$ and $-46°$ F. ($-36.11°$ and $-43.33°$ C.), they produce a conveniently fluid slush that has a relatively high specific heat, so that they are able to transfer more heat per unit volume than other brines used for this purpose. The high specific heat of this slush, representing a negative quantity of heat stored up during the formation of the slush ice crystals in the brine, allows these brines to resist the "shock" effect produced by the initial immersion of large quantities of product in the brine, which results in a localized heating that temporarily "exhausts" of the brine's ability to chill products.

On the other hand, it is also important to avoid the deterioration of cellular structure that occurs when tissues are kept at an excessively low temperature. The cross-linking of molecules and loss of hydration that occurs in the frozen state, problems often referred to collectively as "freezer burn", must be minimized. Because this also tends to limit how low the temperature of the brine can be reduced to prevent brine-shock and brine-exhaustion, it further emphasizes the importance of the high specific heat of cruciferous-oil brines.

Figure 1A:
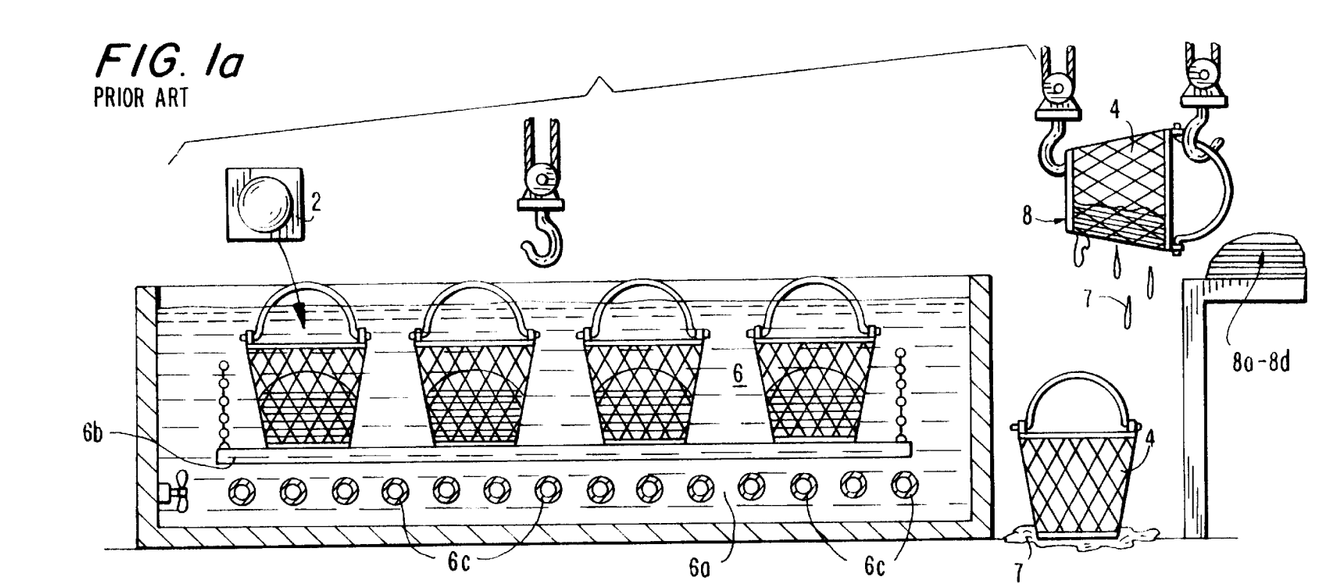
FIGS. 1a and 1b show a prior art freezing system.

In immersion batch-freezing systems conventionally used to freeze whole fish and cuts of raw meat, as well as vacuum-sealed ready-to-eat food portions, ice-crystal formation is poorly controlled. Individual fish or chops, or individual food bags 2, are stacked into freezer bins or piled into an ordinary basket 4 and dunked into a tank 5 holding a liquid nitrogen or brine bath 6, as shown in FIG. 1a. However, in these piles, the inner items freeze slower and, even in single-layer stacks, all items 2 freeze more slowly than they would if they were less closely packed. Furthermore, items in a pile or stack tend to freeze together, requiring separation steps that may either damage the bag or partially defrost the product, risking further damage to its texture and flavor.

The batch-processing basket 4, shown in FIG. 1, is conventionally 3.5-feet high, 3.5-feet thick and 4-feet wide (1.07 m×1.07 m×1.22 m). Adding shelves to the baskets 4 so as to lay out one layer on each shelf, provides space for a total of 288 lbs (130.64 kg.) of 12-ounce (34-gram) portions of food. Single layers provide a better-controlled rate of freezing by allowing the brine in the bath 6 to flow both over and under each item in the basket 4. However, these portions must still be loaded, unloaded and then rinsed and dried individually. This is labor-intensive and risks damage to the integrity of the bag and to the condition of the food item itself. Also, the shelf-type separators are awkward to carry during loading and unloading, but unfrozen portions may be difficult to load into slot-type separators and ice may form between the slot and the portion during the unloading process, if the ambient air is humid, sticking the portion to the slot.

Conventional brine freezing operations dump the basket 4 of frozen items into a rinse sink, to remove brine residues, and then pulls the items out one-by-one to drain and dry before packaging. In each batch, all the handling required for these processes must be completed very quickly, or under refrigeration, to prevent thawing and consequential recrystallisation. The greater amount of handling required to process small individual portions merely adds to the need for speed. Moreover, the rinse and drying time of each item must be strictly controlled, which is impossible when using a rinse sink.

Fluid-convection and surface-conduction continuous-conveyor freezing systems are used for longer runs of frozen products. U.S. Pat. No. 5,522,227 discloses conveyor-belt system on which each item is first carried into a freezing brine and then drained as the item emerges from the brine. U.S. Pat. No. 4,531,373 discloses a contact-cooling belt that eliminates the draining step. U.S. Pat. No. 4,555,914, and the '183 patent use dual-conduction in contacts between the moving items and two surfaces cooled by brine, brine contained in both a lower steel tank and an upper flexible plastic tank and each tank provides one of the contact surfaces.

In either batch or continuous processes, whenever brines are used, brine residues and brine drip are both problematic. The continuous processes in U.S. Pat. Nos. 4,534,183 the ('183 patent) and 5,168,712 addressed this drip and residue problem by using a steel or plastic web interposed between the brines and material being frozen and then merely separating the web from the frozen item to avoid inconvenient, time-consuming rinsing 8a and drying 8b operations, used in the batch process shown in FIGS. 1a and 1b.

SUMMARY OF THE INVENTION

In accordance with the present invention, a ribbon enclosing a plurality of items is fed onto a rack and supported by the rack as the ribbon moves across a freezing tank containing a fluid. The ribbon is then removed from the rack and prepared for shipment.

In one embodiment the fluid is a brine and the ribbon is moved through rinse and dry stations after being removed from the rack and before being prepared for shipping. In a further embodiment, the ribbon is moved through pulsed disinfecting light after being rinsed.

In a particular embodiment, the rack is submerged in the fluid after it is threaded with a piece of the ribbon. In a preferred embodiment the rack is moved through the tank by the liquid flowing in the tank.

In one particular embodiment, the rack has several levels and each level of the rack is threaded by a jig having respective ribbon shoes that turn the ribbon at the end of each level in the rack to thread the next level of the rack in the opposite direction. Preferably the jig also includes drive means for propelling the ribbon as it travels into the rack.

In accordance with another embodiment of the present invention, the ribbon is moved continuously through the fluid in the same direction in one dimension while reversing direction in another dimension.

In another particular embodiment, apparatus in accordance with the present invention comprises a freezing tank and a rack providing a vertically serpentine path for the ribbon as the ribbon moves through the tank. The rack is disposed in the tank so that the ribbon is covered by a solution contained by the tank as the ribbon reverses direction. The ribbon is threaded into the serpentine path of the rack.

In another particular embodiment, apparatus in accordance with the present invention comprises a freezing tank and a rack having an axis of rotation and a round cross section orthogonal to that axis of rotation. The rack is disposed in the tank so that the ribbon is covered by a solution contained by the tank as the ribbon reverses direction. The ribbon is wound in a spiral about the rack.

In a particular embodiment, the rack includes spiral support members that are spaced so as to suspend individual items between two support members during part of the rack's rotation. In a preferred embodiment, the brine flows into the tank through said cross section of the rack parallel to the axis of rotation of the rack.

The ribbon provides improved temperature control in freezing and improves efficiency in handling the items in the rinse, dry and disinfect stages of the packing process.

BRIEF DESCRIPTION OF THE DRAWINGS

The invention will be better understood when the detailed description of the preferred embodiments, given below, is considered in conjunction with the drawings provided, wherein:

FIGS. 3b through 3f are schematic diagrams of ribbon racks for use in the continuous-process freezing system shown in FIG. 3a.

In these drawings, like elements are assigned like reference numerals.

DETAILED DESCRIPTION OF THE PREFERRED EMBODIMENTS

Figure 2A:
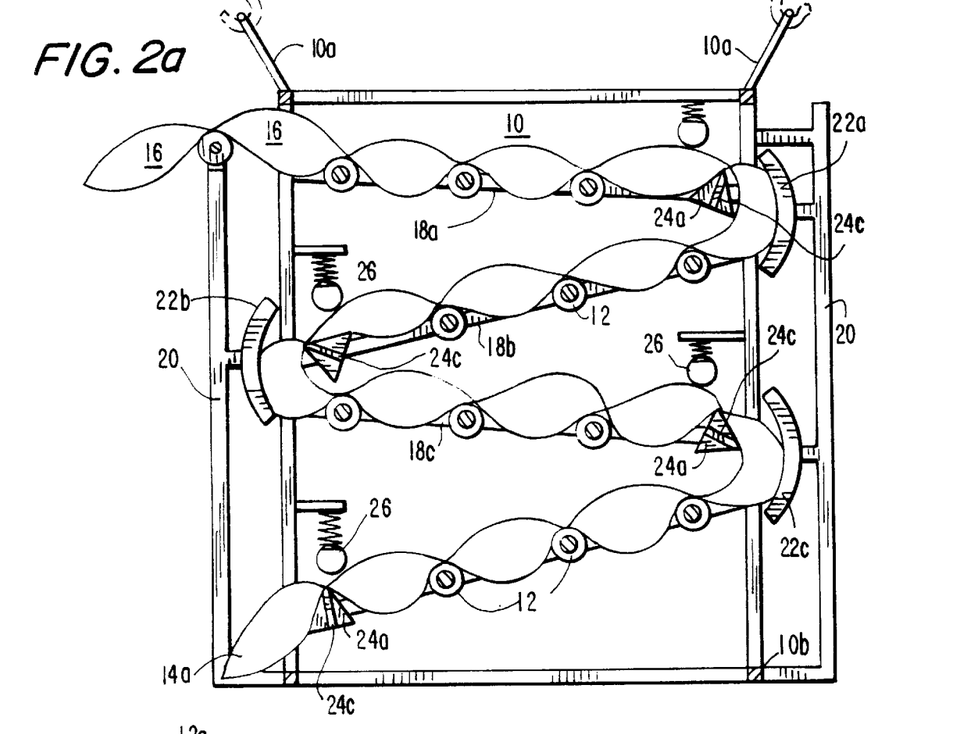
FIGS. 2a, 2b and 2c are schematic diagrams showing a batch-process self-unthreading rack received in a threading jig in accordance with a first embodiment of the present invention, in cross section, elevation and plan view, respectively.
Figure 2B:
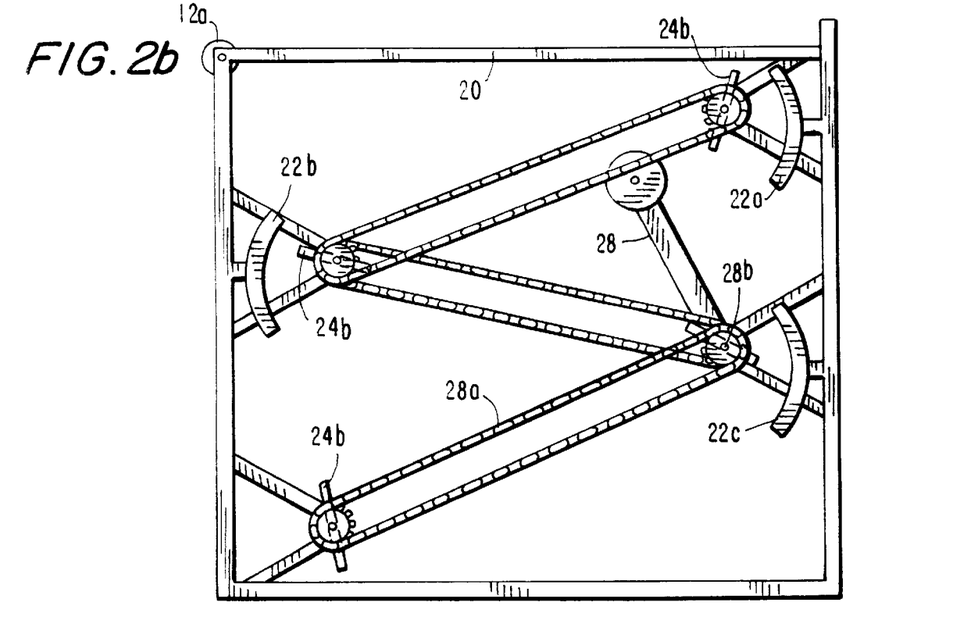
Figure 2C:
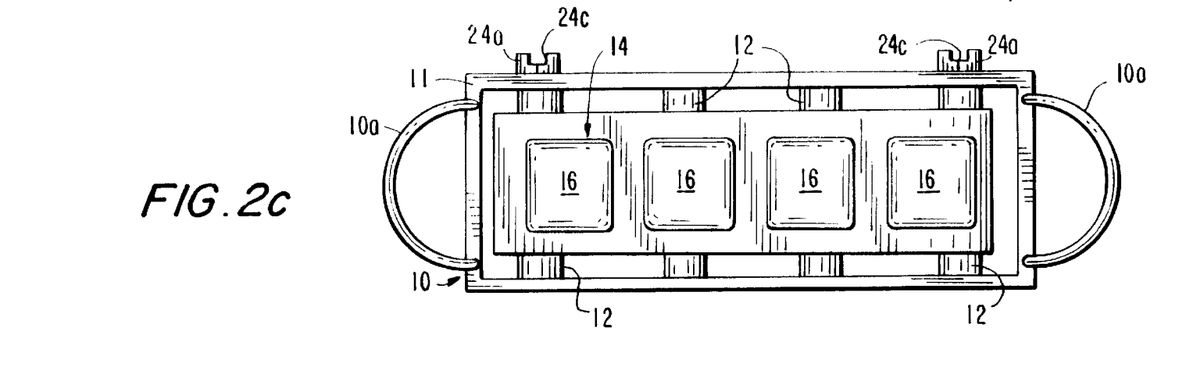

With reference now to FIG. 2a to 2c, a self-unthreading ribbon rack 10 for a batch-process freezing system in accordance with the present invention provides roller guides 12 that direct a ribbon 14 containing vacuum-sealed food portions 16 across the width of the rack 10. The roller guides 12 support the ribbon 14 at a series of different levels 18 within the rack 10. A presently-preferred ribbon rack frame 11 for supporting a batch of 32 12-ounce (34-gram) portions 16 is 12" high, 12" thick and 48" wide (0.3×0.3×1.22 meters). This rack size is particularly advantageous in that it can be lifted by one person without special equipment. The rack frame 11 is also constructed as a simple framework of beams so as to minimize its resistance to the flow of the brine slush in the bath 6 and its tendancy to retain the slush when it is drained 8 in the drain tray 30.

Figure 2D:
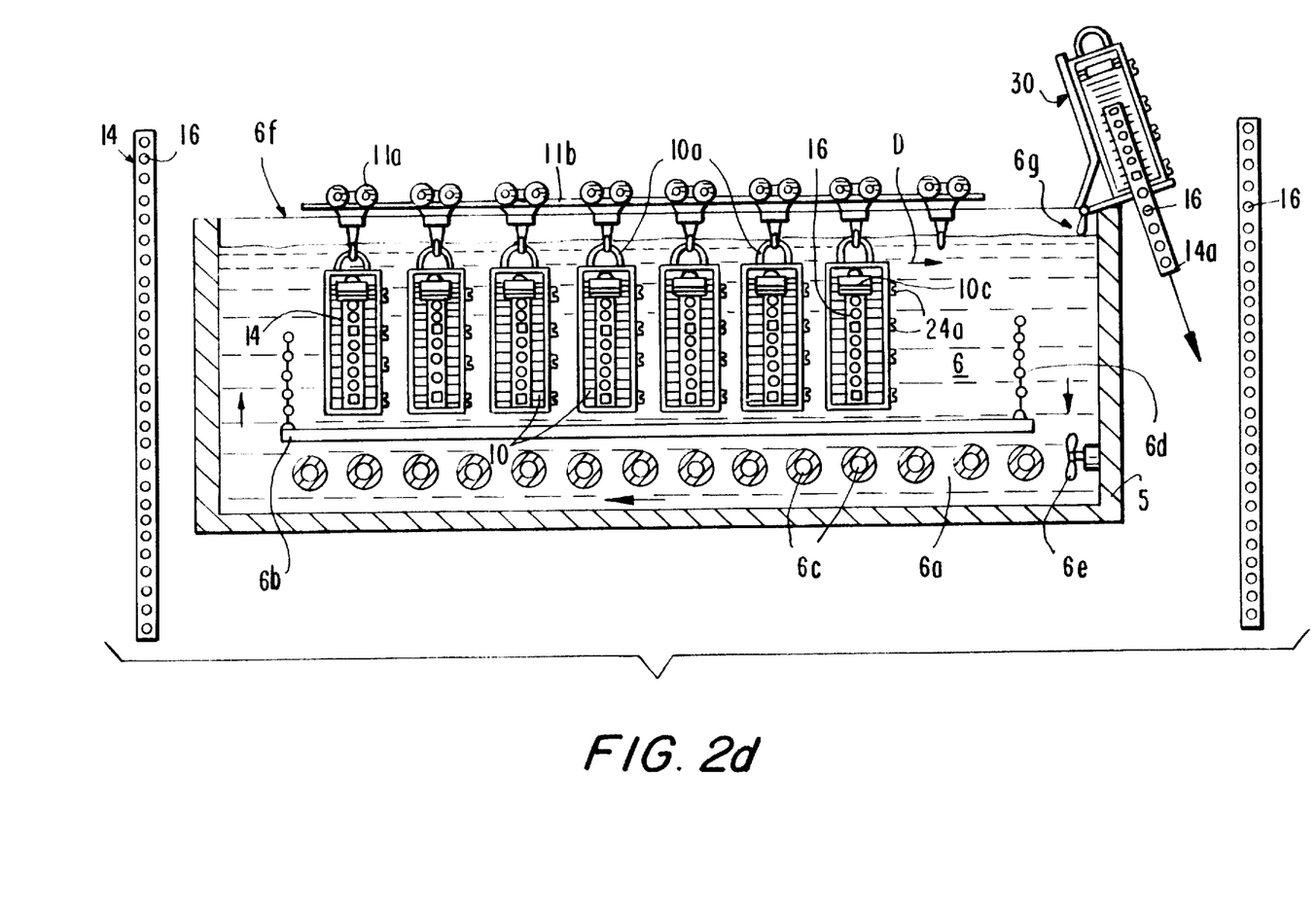
FIGS. 2d and 2e are schematic diagrams showing a batch-process freezing system in accordance with a first embodiment of the present invention.

As shown in FIG. 2d the brine bath 6 preferably has a stainless-steel floor 6b that separates the baskets 4 or racks 10 in the bath 6 from a plenum 6a in the bottom of the tank 5 where the brine is chilled by refrigerant coils 6c. The brine is injected into the bath 6 by an impeller 6e at the loading end of the bath 6f, to reduce the risk of thermal shock. To maximize heat transfer in this batch process, the volume of flow is maximized and turbulence at entrance 6f and exit 6g from the bath is minimized by forcing the chilled brine to flow up into the bath at the loading end 6f of the bath 6, and down into the plenum 6a again at the unloading end 6g of the bath 6 across the entire width of the tank through mesh plates 6d at each end of the floor 6b that prevent the baskets 4 or racks 10 from blocking the brine flow.

In accordance with the present invention, the food portions 16 are contained within a sixteen-foot (4.88-meter) vacuum-sealed food-grade polypropylene ribbon 14. Thus continuous operation of the brine bath requires only two people, one cutting and threading ribbons 14, the other removing and cleaning them 8a–8c. Furthermore, a rack this size has a slight buoyancy when the product is wholly immersed in the brine bath, depending on the product being frozen and the manner in which it was prepared: boneless meat tends to be more bouyant than fish.

Each rack 10 has a pair of handles 10b that are suspended from hooks on substantially frictionless trolley-glides 11a. The glides 11a are supported by one of a pair of parallel guide rails 11b. Each rack 10, guided by the rails 11b, is propelled by the brine as it flows across the brine bath 6 from the workstation where the sixteen-foot lengths of vacuum-sealed ribbon 14, as they emerge from the multivac, are threaded into the racks 10, to the drain tray 30 where the ribbons 14 are removed from the racks 10. Bouyancy can be adjusted by adding a float 10c to the top of the rack 10, if desired.

The rack 10 is loaded by inserting the rack into the loading jig 20, shown in FIG. 2b. The jig 20 provides respective turning shoes 22 at the end of each level 18 defined by the roller guides 12. The ribbon 14 is threaded onto the roller guides 12 in the rack 10 by being pushed across on the roller guides 12 on the top level 18a of the rack 10 until the sixteen-foot ribbon 14 abuts the first turning shoe 22a. The turning shoe 22a redirects the ribbon 14 onto the next level 18b of the rack 10, and so on.

The jig 20 has respective rotary pins 24b that engage slots 24c in one end of each of a plurality of drive rollers 24a in the rack 10. The drive rollers 24a cooperate with spring-loaded idler rollers 26 in the rack 10 to propel the ribbon 14 past the shoes 22 until the lead end of the ribbon 14a appears at the exit slot 20a at the bottom of the jig 20. The drive rollers 24 are turned by a hand crank 28, having a handle 28a and a sprocket drive 28b, as shown in FIG. 2b. However the guide rollers 24 may, alternatively, be motor driven.

The self-unthreading ribbon rack 10 of the present invention is threaded using a combination of gravity and rotary drive. However, the rack 10 is unthreaded in a single motion, after the rack and ribboned have drained 8, by merely grasping the ribbon 14 that extends from the bottom end 10d of the threaded rack 10 and pulling. The entire sixteen-foot ribbon is then rinsed 8a, air-dried by a flow of cool ambient air 8b and irradiated 8c intact, for the sake of safe, efficient handling.

After being removed from the rack 10, each ribbon is inserted into a vertical slot in a gate 56b that feeds the ribbon 14, lengthwise, into a series of vertical guide rollers 56c where the whole ribbon 14 is processed in an edgewise orientation. This is particularly advantageous for more efficient rinsing and drying 8a, 8b, but it also makes conventient, top-down inspection of both processed surfaces possible, as discussed in more detail below with reference to the ribbon racks used for continuous-processing.

The loaded rack 10 is drained 8 by lifting it out of the brine bath 6 onto a drain tray 30 that returns the brine directly to the plenum 6a, minimizing its effect on other rack being of food being frozen. The location of the tray 30 over the tank, and its direct path to the plenum 6a recycles 90% of the brine such as the brine 7 that otherwise is lost: dripped from the rack onto the factory floor or trapped on the ribbon 14 until it is rinsed away 8a. After the draining 8 and cleaning processes 8a–8c are complete, the respective portions 16 in the sixteen-foot ribbon 14 are turned flat again, cut apart from each other and boxed for shipment 8d.

It has been found that the ribbon-rack method and apparatus in accordance with the present invention improves both the labor efficiency and the temperature control needed in the food-freezing process. The self-unthreading ribbon rack 10 in a head-to-head competition with the more conventional slot-loading rack process has proved more successful in both these categories: labor-efficiency and freezing-rate control.

Figure 1B:
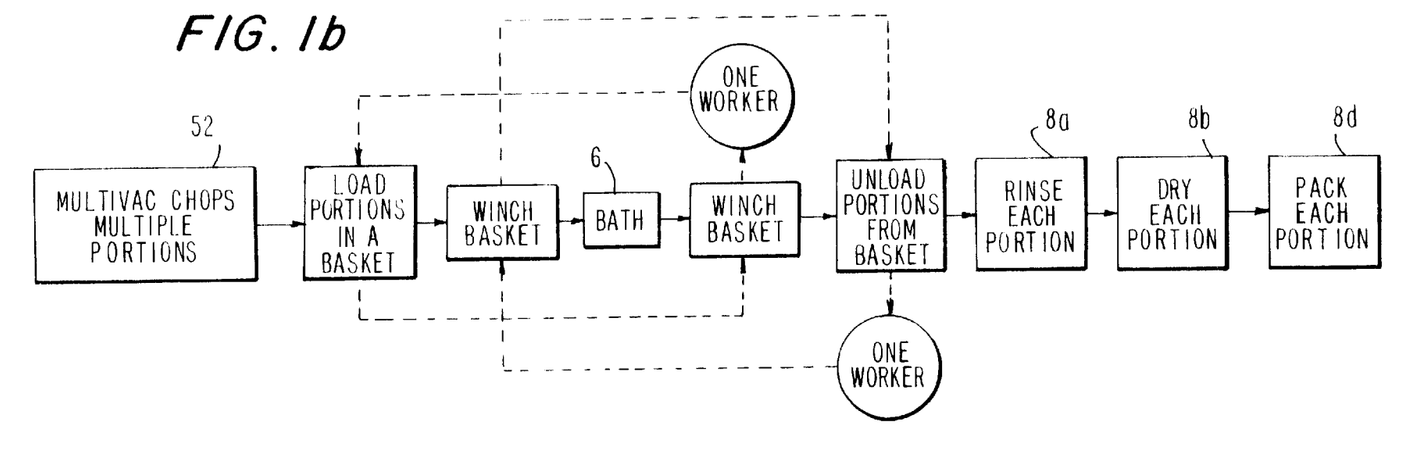

Large baskets, each containing around 288 pounds (130.64 kg) of raw fish or 12-ounce portions are conventionally used for freezing piled batches of those food portions in a brine bath, because of the assumption that industrial efficiencies of scale would accrue. However, these are even less efficient because the items must be handled individually in the cleaning process, and the finishing processes do not proceed in an orderly, continuous manner when the work crew must drop what they are doing to help hoist a 288-pound basket, as indicated in FIG. 1b, leaving workers further down the line intermittently without food products to process.

Figure 2E:
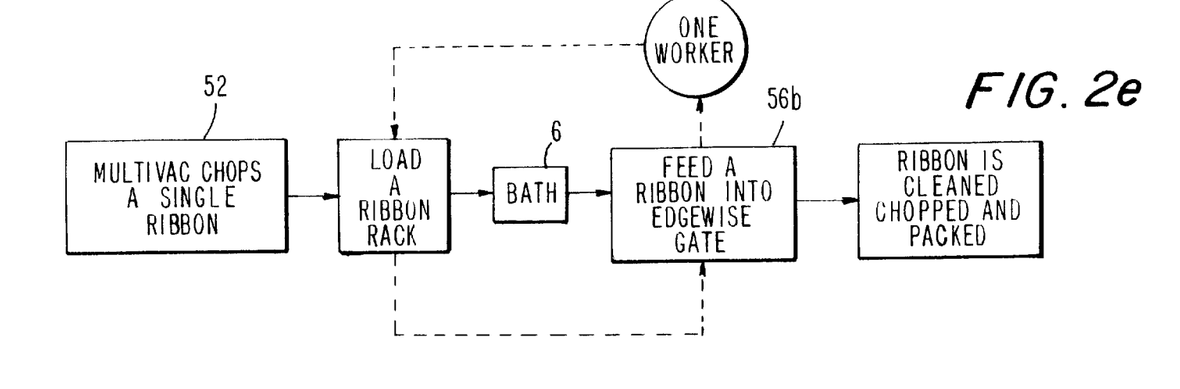

Ten smaller, shelf-loading baskets, or ten ribbon racks 10, can produce 240 pounds (108.86 kg) of 12-ounce portions. Loosely packed, the shelf-baskets 4 required the same amount of freezing time as the ribbon racks 10, but twice the loading time (0.1 worker-hours) and about 50% more finishing time for rinsing, drying, treating, packing and storing (2.2 worker-hours), in contrast to the process of FIG. 2e, for a total of 3.8 worker-hours.

Of course, the greater disadvantage of the large baskets 4 is their performance in the brine bath 6 itself, even when the food items are supported on loosely-packed shelves within the basket so as to permit brine to flow past the sides of each item. Providing an internal temperature of −15° F. (−26.11°

C.) for all 12-ounce food portions in a 288-pound batch required 50 minutes for a basket where the entire 288-pound batch was supported in single layers on respective shelves within the basket 4. In contrast, immersing one of the ribbon racks 10 in the bath 6 every minute resulted in 288 pounds of 12-ounce food portions reaching the desired –15° F. (–26.11° C.) in only 25 minutes.

The same tank was used in each case, a standard brine-bath freezing unit 13 feet long by 4.5 feet wide by 46-inches deep (3.96 meters×1.37 meters×116.75 centimeters). The cruciferous-oil brine in which the portions 16 were immersed was 42-inches (106.60-centimeters) deep and cooled in a plenum 6*a* below the bath 6 to a temperature of –40° F. (–40° C.) The brine flowed across the tank at a rate of 3 feet/minute (0.91 meters/minute) floating the loaded racks toward the cleaning and packing stations 8*a*–8*d* at a rate of 1.5 feet/minute (0.46 meters/minute), about half the speed of the brine. It appears that racks' slight resistance to brine flow in itself encourages mixing across any temperature differential that might otherwise form in the bath, without producing localized stagnation that would compromise temperature control for individual portions 16 in the bath.

The freezing rate of the large, conventional 288-pound capacity baskets is not only slower, the lowering of such a large basket of raw fish into the brine "shocks" the brine it contacts, reducing ice-crystal content. This reduces the overall cooling capacity of the brine passing around and through the basket 4, as well as locally raising its temperature, delaying the brine's return to the desired temperature range. In the head-to-head tests, when shocked by the sudden local introduction of the massive 288-pound basket of single-layer raw salmon steaks, the brine exceeded the high-temperature limit of –37° F. (–38.33° C.) in and around the 288-pound basket by as much as 5° F. (3° C.), shortly after immersion. When brine enters from the plenum 6*a* at a temperature of –40° F. (–40° C.), the lower limit of the desired temperature range, it will quickly become exhausted, too warm for the desired rate of freezing. Attempting to increase efficiency by freezing two 288-pound baskets in the bath 6 quickly warms the enitre bath to –34° F.

Thus, because of the thermal shock caused by the simultaneous immersion of large quantities of product into the brine bath, and because of excessive local temperature variations permitted by local exhaustion of the brine, the internal freezing rate of individual portions 16 of the product cannot be properly controlled when large racks or baskets used, even though the items are separated from each other within the rack to expedite their freezing. Thus much of the texture and taste advantages of using the complex, expensive cruciferous-oil brines are dissipated anytime such large racks are used for batch processing.

Figure 3A:
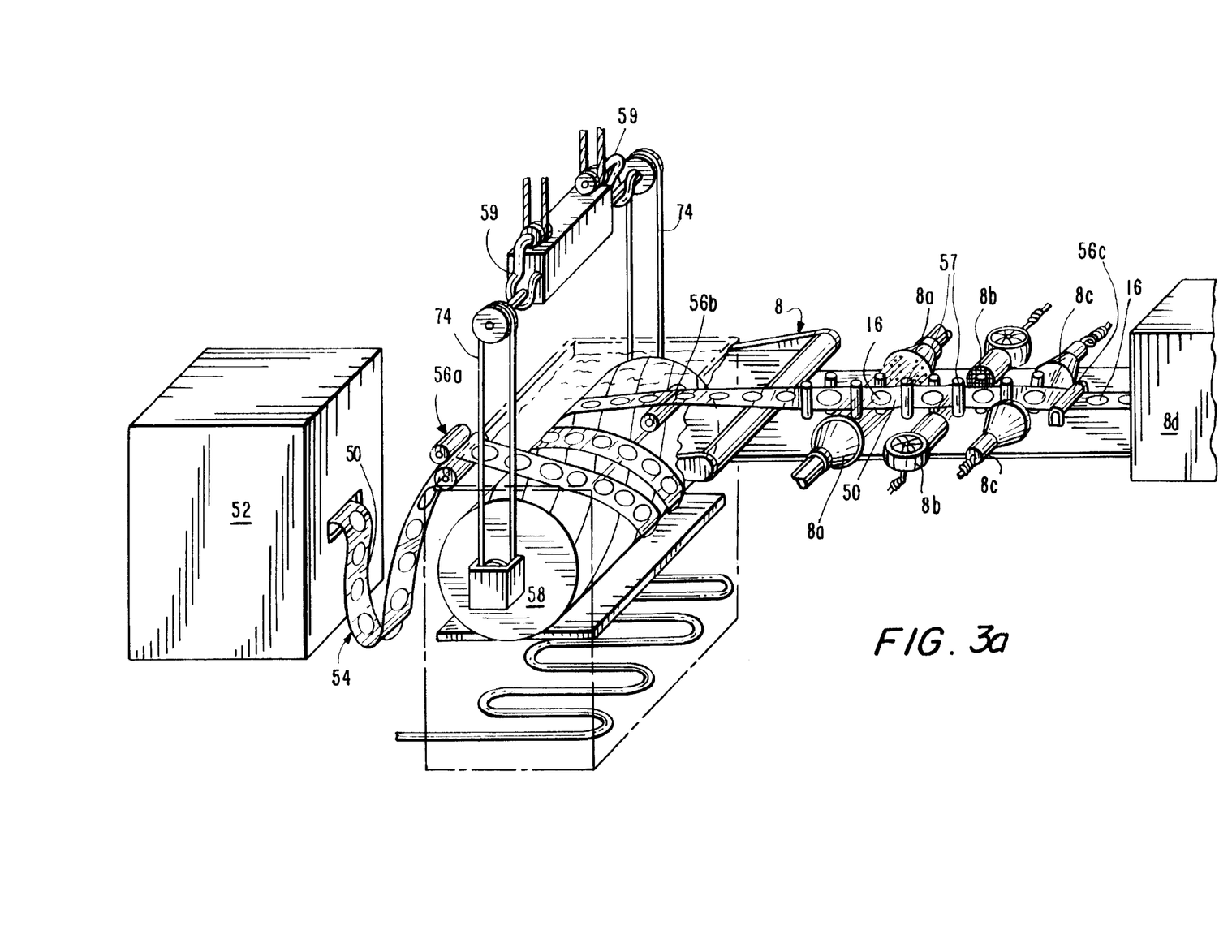
FIG. 3a is a schematic diagram showing a continuous-process freezing system in accordance with the present invention.

FIG. 3*a* shows a continuous-process freezing system in accordance with a second embodiment of the present invention. In this system, a continuous ribbon 50 of vacuum-sealed portions 16 is supplied in batches by a "multivac"-type wrapping machine 52. The ribbon passes through a catenary 54, that provides slack to compensate for the discontinues output of the wrapping machine 52, to the intake chute 56 at the top of a pre-threaded, horizontal rotary freezing rack 58.

The rotary freezing rack 58 is threaded at the beginning of each production run by winching the rack out of the brine bath 6 a wrapping a heavy mono-filament nylon line about the circumference of the rack 58 in place of the more-expensive food-grade polypropylene ribbon material. The trailing end of the nylon line 70 is heat-sealed onto the leading end 50*a* of the ribbon 50, so that the precisely-controlled freezing of product can begin immediately, without false starts or discarded product, when the rack is returned to the brine bath and begins to rotate again.

Figures 3B, 3C, 3D:
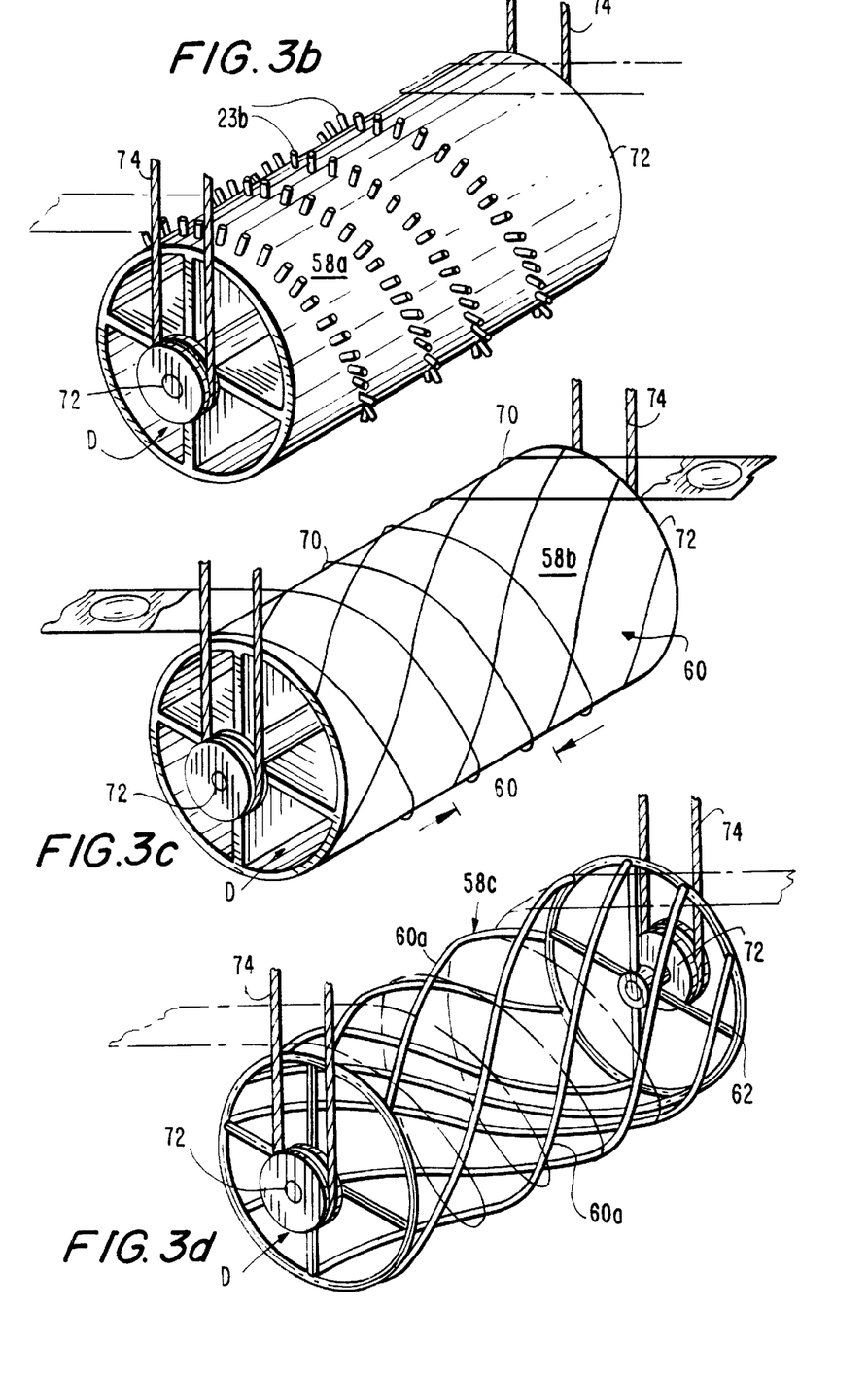
Figure 3E:
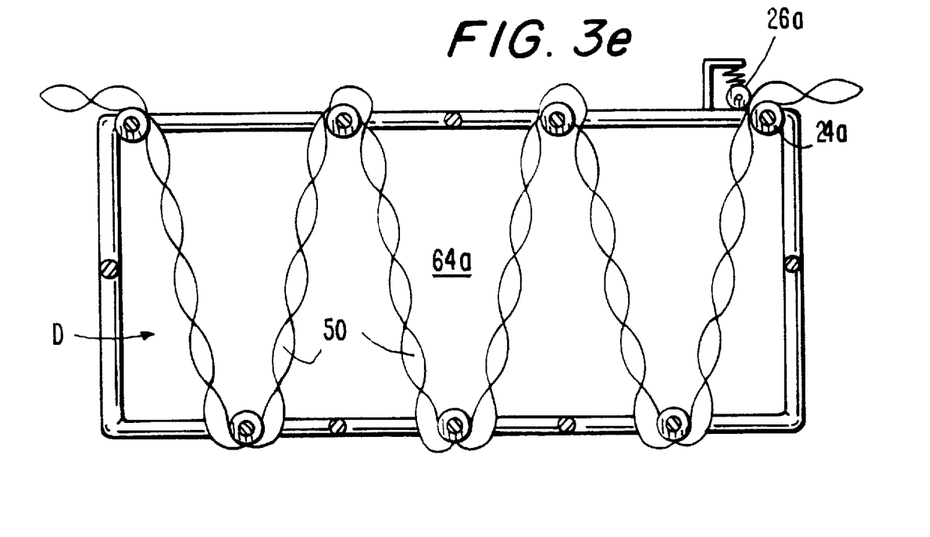

The rotary freezing rack 58 may be a simple stainless steel cylinder 58*a* having guide pins 23*b* extending radially from its surface to define a helical path for the ribbon 50. It is preferably a stainless steel cylinder 58*b* having a longitudinal surface made up of helical planes 60, for processing tuna or salmon steaks, for example, the planes 60*a* are 10.5 inches (26.65 cm) wide. The helical planes 60 lie orthogonal to angle α of the ribbon 50 where it contacts the rack 58*b*, so that sequences of individual portions 16, each approximately 10.5-inches long, are supported on sequences of respective individual helical planes 60 about the circumference of the rack 58*b*, the width of each plane being substantially equal to the length of each portion. These planes 60*a* assure that the product that emerges from the brine will have at least one flat surface, a geometric feature required by the design of the packaging used for some products.

Alternatively, the rotary freezing rack 58*c* is made up of a plurality of helical rods 60 that are 10.5-inches apart and supported by circular frames 62 that maintain a substantially cylindrical rack surface. Like the helical planes 60, the rods 60*a* lie orthogonal to angle α of the ribbon where it contacts the rack. In this way, individual portions 16 in the ribbon 50 are suspended between respective pairs of rods 60*a*, which is advantageous for use with items that are not frozen flat.

Figure 3F:
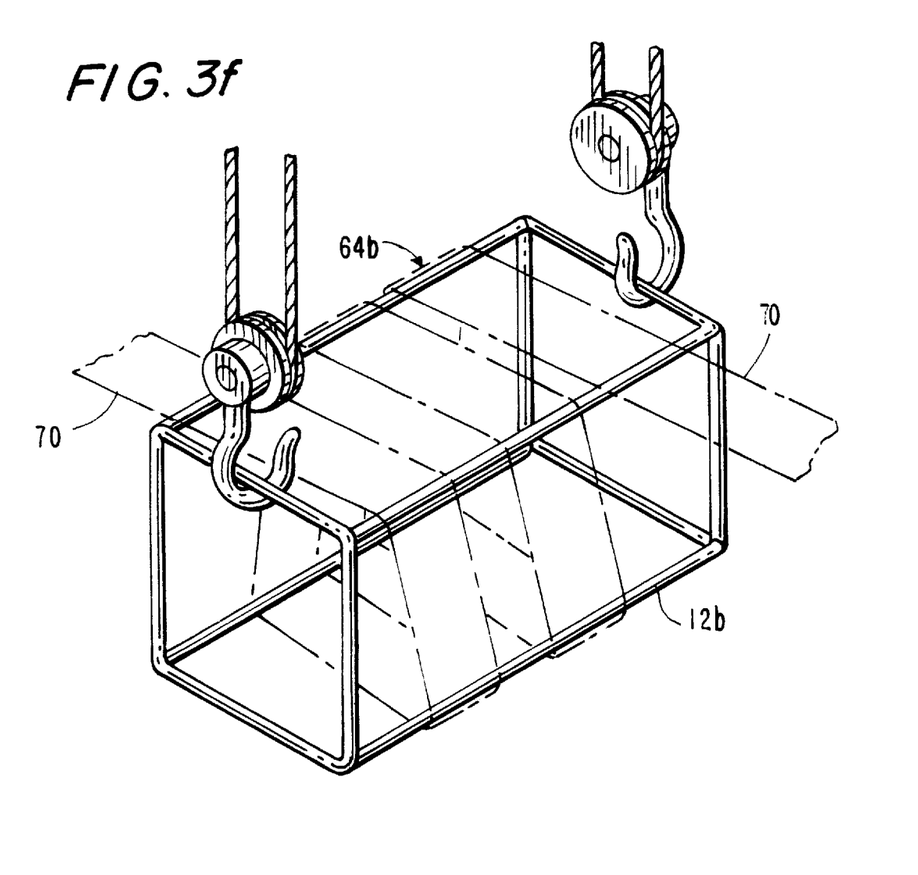

For the sake of convenience, the helical planes 60 or rods 60*a* may define slightly spiral surfaces and the rack 58*b*, 58*c* may also have a slightly frustro-conical shape that narrows at the end of the brine bath 6 where the ribbon 50 emerges from the brine, as shown in FIG. 3*c*. This narrowing of the rack 58*b* and, consequently, the narrowing of the width of the helical planes at that end 60*b* or the distance between rods (not shown) in each type of rack 58*b*, 58*c* expedites release of the ribbon 50 from the rack by modifying the surface speed of that part of the rack 60*b* and also gradually eliminating the previous congruency of the frozen items 16 with the rifled surface of the rack 58*b* or 58*c*, for example the congruency of the 10.5-inch length of ribbon for each salmon steaks and the 10.5-inch widths on the helical racks 58*b* or 58*c* that support them near the entrance guide 56*a*. The continuous ribbon 50 could also be threaded along a vertical serpentine-path support frame 64*a*, so that the ribbon passed vertically up and down through the brine along the length of the brine bath 6. It should be noted that, for this serpentine rack 64*a*, the brine should flow across the tank to and from the plenum 6*a* in a direction perpendicular to the lengthwise movement of the ribbon 50 and to the flow of the brine in the other embodiments, so that it encounters the ribbon 50 edgewise, minimizing the obstruction by the ribbon of the brine flow. Thus the openings between the bath 6 and the plenum 6*a* must be relocated to the side walls of the bath. Alternatively, a stationary roller cage 64*b* made up of four or more parallel roller bars could be provided. The ribbon 50 would then be wrapped around the cage 64*b* and pulled through the bath 6, as shown in FIG. 3*f*.

Either of these two latter devices 64*a*, 64*b* provides an edgewise, vertcal ribbon path that reduces the effect on the ribbon 50 of the temperature differential caused by thermal layering within the brine bath 6, averaging the temperature to which the ribbon 50 is exposed, and minimizes the ribbon's resistance to the flow of brine. However, the corrosiveness of most brines make the gearing and journalling of the moving parts 12b, 24a, 26a required by both the vertical serpentine rack 64a and the roller cage 64b very expensive and not very reliable. Furthermore, the helical movement of the ribbon 50 around the roller cage 64b risks distorting or breaking the ribbon 50 in some applications. The axis of rotation 72 in the three rotary racks 58a, 58b, 58c lies parallel to the flow of brine through the bath 6, to and from the plenum 6a. The rotary freezing racks 58 have a horizontal axis of rotation 72, driven by nylon-web belts 74 or a non-corrodible "polydrive" chain linkage.

To provide a variable dwell time, the time during which a portion 16 is immersed in the brine as it travels along the racks 58a, 58b and 58c, the number of turns of the ribbon 50 around the racks is varied and the position of the entrance and exit chutes 56a, 56b are moved along a line parallel to the axis 72 of these rotary racks to maintain the proper alignment for the feed angle α. Alternatively, the guide pins 23b may be repositioned along the simple cylindrical surface of the rack 58a shown in FIG. 3b.

After exiting from the brine bath 6, the ribbon 50 is turned on edge by the exit chute 56b and is supported on edge through the draining 8, rinsing 8a and blow-drying 8b stages by vertical guide rollers 57. After the ribbon is blow dried with ambient air 8b, the ribbon 50 is also disinfected by pulsed, high-energy lights 8c, such as those used in the PureBright™ process available from PurePulse Technologies, Inc. of San Diego, Calif. This cleaning process removes contaminants from the surfaces of the ribbon 50, while protecting the critical temperature stability of its contents 16. The ribbon is then again laid flat by an idler roller 56c at the entrance to the packaging line 8d, where the ribbon of frozen items is finally cut to separate the individual portions 16 and then boxed for shipment, and for storage in a store's freezer case where it is displayed to consumers.

The invention has been described with particular reference to a presently-preferred embodiment thereof. However, it will be apparent to one skilled in the art that variations and modifications are possible within the spirit and scope of this invention. The invention is defined by the claims appended below.

What is claimed is:

1. Apparatus for freezing a plurality of items enclosed in a ribbon in a bath, said apparatus comprising:

said bath having first and second opposing sides and a flow of a fluid;

a rack in said bath, said rack being disposed to permit travel of the ribbon through said bath between opposing sides of said bath while providing reciprocating travel of the ribbon through said bath in a vertical direction, wherein said rack provides a vertically serpentine travel path for the ribbon through said bath.

2. The apparatus of claim 1, wherein said flow of fluid is orthogonal to said travel of the ribbon between opposing sides of the bath.

3. The apparatus of claim 1, wherein said rack provides a helical travel path for the ribbon through said bath.

4. The apparatus of claim 3, wherein said flow of fluid is parallel to said travel of the ribbon between opposing sides of the bath.

5. The apparatus of claim 1, wherein the rack includes spiral support members that are spaced so as to suspend individual items between two support members during the item's travel through said bath.

6. The apparatus of claim 1, wherein the rack includes spiral surfaces disposed to support individual items on each surface during the item's travel through said bath.

7. The apparatus of claim 1, wherein said rack provides a spiral travel path for the ribbon through said bath.

8. The apparatus of claim 7, wherein said flow of fluid is parallel to said travel of the ribbon between opposing sides of the bath.

9. The apparatus of claim 7, wherein the rack includes spiral support members that are spaced so as to suspend individual items between two support members during part of the item's travel through said bath.

10. The apparatus of claim 7, wherein the rack includes spiral surfaces disposed to support respective individual items on each surface during part of the item's travel through said bath.

11. The apparatus of claim 1, wherein a line is heat sealed to a first end of the ribbon, said line being supported on said rack between said first and second opposing sides of said bath.

12. The apparatus of claim 1, wherein selectably-positioned guide pins are provided on said rack, said guide pins defining the number of reciprocal turns on said rack, and cooperating with the rotation rate of said rack to determine the dwell time for each item in said bath.

13. The apparatus of claim 1, wherein a selectably-positioned exit guide is provided for said rack, said exit guide cooperating with the number of reciprocal turns in said ribbon on said rack, and the rotation rate of said rack, to determine the dwell time for each item in said bath.

14. Apparatus for freezing a plurality of items enclosed in a ribbon in a bath, said apparatus comprising:

said bath having first and second opposing sides and a flow of a fluid;

a rack in said bath, said rack being configured to support the ribbon through said bath between opposing sides of said bath and to provide a reciprocating travel path for the ribbon through said bath in a vertical direction.

* * * * *